(12) United States Patent
Yu et al.

(10) Patent No.: US 11,604,512 B1
(45) Date of Patent: Mar. 14, 2023

(54) FINGERTIP-MOTION SENSING DEVICE AND HANDWRITING RECOGNITION SYSTEM USING THE SAME

(71) Applicant: City University of Hong Kong, Hong Kong (CN)

(72) Inventors: Xinge Yu, Hong Kong (CN); Yiming Liu, Hong Kong (CN); Jingkun Zhou, Hong Kong (CN)

(73) Assignee: City University of Hong Kong, Hong Kong (HK)

( * ) Notice: Subject to any disclaimer, the term of this patent is extended or adjusted under 35 U.S.C. 154(b) by 0 days.

(21) Appl. No.: 17/647,033

(22) Filed: Jan. 5, 2022

(51) Int. Cl.
*G06F 3/01* (2006.01)
*G06F 3/0346* (2013.01)

(52) U.S. Cl.
CPC .............. *G06F 3/014* (2013.01); *G06F 3/017* (2013.01); *G06F 3/0346* (2013.01); *G06F 2203/0331* (2013.01); *G06F 2203/0384* (2013.01)

(58) Field of Classification Search
None
See application file for complete search history.

(56) References Cited

U.S. PATENT DOCUMENTS

| | | | | |
|---|---|---|---|---|
| 2008/0192005 | A1* | 8/2008 | Elgoyhen | G06V 40/20 345/158 |
| 2015/0220922 | A1* | 8/2015 | Elangovan | G06Q 20/40 705/44 |
| 2016/0313798 | A1* | 10/2016 | Connor | G06F 3/017 |
| 2017/0215495 | A1* | 8/2017 | Okumiya | A41D 19/0013 |
| 2017/0347021 | A1* | 11/2017 | Kawai | H04N 5/23203 |
| 2018/0335843 | A1* | 11/2018 | Erivantcev | A63F 13/211 |
| 2019/0332140 | A1* | 10/2019 | Wang | G06F 3/016 |
| 2020/0201443 | A1* | 6/2020 | Huang | G06V 30/32 |
| 2021/0096660 | A1* | 4/2021 | Xie | G06F 3/04162 |

FOREIGN PATENT DOCUMENTS

| | | | | |
|---|---|---|---|---|
| CN | 109521876 | A * | 3/2019 | G06F 3/014 |
| DE | 102005021527 | A1 * | 11/2006 | G06F 3/017 |
| WO | WO-2004114107 | A1 * | 12/2004 | G06F 3/014 |

OTHER PUBLICATIONS

L. Jing, Z. Dai and Y. Zhou, "Wearable handwriting recognition with an inertial sensor on a finger nail," in 2017 14th IAPR International Conference on Document Analysis and Recognition (ICDAR), 2017, vol. 1: IEEE, pp. 1330-1337.

* cited by examiner

*Primary Examiner* — Benjamin X Casarez
(74) *Attorney, Agent, or Firm* — S&F/WEHRW (57) ABSTRACT

In a handwriting recognition system, a fingertip-motion sensing device has first and second body parts respectively wearable on a distal phalanx and a proximal phalanx of a finger, and a bendable bridge connecting the two body parts. An accelerometer module in the first body part generates acceleration data of the fingertip motion whereas a battery module powering the accelerometer module is in the second body part, avoiding the first body part to be loaded with the battery module so as to reduce hindrance to a user in handwriting. The bridge is wavily shaped, enabling it to be extensible and retractable to avoid spurious interference generation due to unintended movement between the first body part and the distal phalanx. The sensing device wirelessly transmits the acceleration data to a computing device, which analyzes the acceleration data to determine handwritten characters by using a machine-learning classifier, preferably a convolutional neural network.

15 Claims, 12 Drawing Sheets

(a) Straightened finger  (b) Bent finger

FINGERTIP-MOTION SENSING DEVICE AND HANDWRITING RECOGNITION SYSTEM USING THE SAME

ABBREVIATIONS

3D Three-dimensional
CNN Convolutional neural network
FPCB Flexible printed circuit board
IMU Inertial measurement unit
Li Lithium
MCU Microcontroller unit
PCB Printed circuit board
PDMS Polydimethylsiloxane
PI Polyimide
SNR Signal-to-noise ratio
t-SNE t-Distributed Stochastic Neighbor Embedding

TECHNICAL FIELD

The present disclosure relates generally to a fingertip-motion sensing device and a handwriting recognition system. In particular, the present disclosure relates to the sensing device that is flexible and lightweight, and the handwriting recognition system that employs a machine-learning classifier for handwritten-character recognition based on the fingertip motion measured by the sensing device.

BACKGROUND

Handwriting recognition, which enables interpreting human handwritten inputs through touchscreens and computer writing pads, is a convenient user-input technique for computers and computing devices. There is increasing interest of using this user-input technique to application scenarios that a person writes handwritten inputs on paper documents or even in the air. That is, the handwritten inputs are written on media that do not have sensors sensing the inputs. In these scenarios, hand gestures and finger motions are usually detected to form handwritten signals and then the handwritten inputs are inferred from the handwritten signals. There are two major requirements for developing a sensing device that detects the hand gestures or finger motions. First, hindrance to the user in carrying out handwriting is avoided. Second, the handwritten signals are detected with high SNRs. By achieving high SNRs, the sensing device is sensitive in handwriting detection, and interference in the detection is substantially suppressed.

Detection of hand gestures or finger motions is conveniently accomplished by using an IMU, such as a gyroscope and an accelerometer. L. JING, Z. DAI and Y. ZHOU, in "Wearable handwriting recognition with an inertial sensor on a finger nail," published in *Proceedings of* 2017 *14th IAPR International Conference on Document Analysis and Recognition (ICDAR)*, pp. 1330-1337, 9-15 Nov. 2017, discloses a sensing unit installed with an IMU and attachable to a fingernail of a user for capturing handwritten signals. Since the IMU directly captures motion signals produced by the fingernail, the sensing device potentially has a high sensitivity. To avoid hindrance to the user in carrying out handwriting, the sensing device is not equipped with a battery module, which is usually a relatively heavy and sizable component. The sensing device is installed with a wireless charging module for powering the sensing unit. Although the battery module is not required to be installed on the sensing unit, the wireless power received is generally low and tight power management is required to be implemented on the sensing unit. It is not easy to allocate a power budget that matches the power requirement of the IMU in achieving a high SNR in detecting handwritten signals.

There is a need in the art for a sensing device installable at or near a fingertip of a user for achieving a high SNR in sensing handwritten signals while getting rid of a battery module from the fingertip for avoiding hindrance to the user in carrying out handwriting.

SUMMARY

A first aspect of the present disclosure is to provide a fingertip-motion sensing device wearable on a finger of a user for sensing a fingertip motion when the user uses the finger to carry out handwriting.

The sensing device comprises a first body part, a second body part, and a bridge connecting the first and second body parts. The first body part is configured to be worn on a distal phalanx of the finger. The second body part is configured to be worn on a proximal phalanx of the finger. The bridge is bendable for enabling the first and second body parts to remain positioned on the distal phalanx and the proximal phalanx, respectively, when the finger bends or is straightened. The first body part comprises an accelerometer module and a wireless communication module. The accelerometer module is used for measuring acceleration of the first body part so as to generate acceleration data of the fingertip motion. The wireless communication module is used for wirelessly transmitting the acceleration data to outside the sensing device. In addition, the second body part comprises a battery module for delivering electrical power via the bridge to the accelerometer module and wireless communication module. Advantageously, it avoids the first body part to be further loaded with the battery module to thereby reduce hindrance to the user in using the finger to carry out handwriting.

Preferably and advantageously, the bridge is extensible and retractable in length, enabling the first and second body parts to be securely stationed on the distal phalanx and the proximal phalanx, respectively, even when the finger bends or is straightened. As a result, it avoids generation of spurious interference due to unintended movement between the first body part and the distal phalanx.

Advantageously, the bridge may be wavily shaped for enabling the bridge to be extensible and retractable in length.

Preferably, the first body part further comprises a MCU for controlling the accelerometer module and wireless communication module. The MCU is configured to generate the acceleration data from raw measurement data obtained by the accelerometer module in sensing the fingertip motion.

In certain embodiments, the wireless communication module is wirelessly communicable with an external device according to a Bluetooth protocol.

Preferably, the first body part is configured to form a first ring for wearing on the distal phalanx. It is also preferable that the second body part is configured to form a second ring for wearing on the proximal phalanx.

In certain embodiments, a respective body part selected from the first and second body parts is formed as an elongated, flexible strip having first and second end portions that are joinable to form a respective ring.

In one embodiment, the first end portion is formed with a first hook clasp and the second end portion is formed with a second hook clasp. The first and second hook clasps are releasably engageable to each other such that the first and second end portions are joinable. In another embodiment, each of the first and second end portions is installed with an adhesive pad such that the first and second end portions are joinable.

Preferably, the sensing device further comprises a FPCB for mounting and electrically connecting the accelerometer module, the wireless communication module, the MCU and the battery module. The FPCB forms a portion of the first body part, a portion of the second body part and a portion of the bridge. In certain embodiments, the FPCB is substantially composed of PI.

Preferably, the sensing device further comprises a first protective layer and a second protective layer collectively used for encapsulating the FPCB. The FPCB mounted with the accelerometer module, the wireless communication module, the MCU and the battery module is sandwiched between the first and second protective layers. In certain embodiments, the first and second protective layers are substantially composed of PDMS.

A second aspect of the present disclosure is to provide a handwriting recognition system for recognizing handwritten characters produced by a user.

The system comprises any of the embodiments of the fingertip-motion sensing device disclosed herein for sensing a fingertip motion of the user when the user wears the sensing device on a finger of the user and uses the finger to carry out handwriting. In addition, the system further comprises a computing device configured to wirelessly receive the acceleration data from the sensing device and determine the handwritten characters from the acceleration data.

Preferably, the computing device is further configured to execute a computing process of determining the handwritten characters from the acceleration data, where the computing process comprises using a machine-learning classifier to determine the handwritten characters from the acceleration data after the machine-learning classifier is trained.

Preferably, the machine-learning classifier is a CNN.

Other aspects of the present disclosure are disclosed as illustrated by the embodiments hereinafter.

BRIEF DESCRIPTION OF THE DRAWINGS

FIG. 12 plots, as experimental results, the writing of a test word "excellent" by handwriting in subplot (a), acceleration data in the form of signal as generated by the sensing device in subplot (b), and the likelihood of each handwritten character being one of the 26 English letters as obtained by the CNN model in subplot (c), where the detected handwritten characters are displayed one-by-one on a computer screen as shown in the subplot (a).

Skilled artisans will appreciate that elements in the figures are illustrated for simplicity and clarity and have not necessarily been depicted to scale.

DETAILED DESCRIPTION

As used herein in the specification and appended claims, the term "avoid" or "avoiding" refers to any method to partially or completely preclude, avert, obviate, forestall, stop, hinder or delay the consequence or phenomenon following the term "avoid" or "avoiding" from happening. The term "avoid" or "avoiding" does not mean that the method is necessarily absolute, but rather effective for providing some degree of avoidance or prevention or amelioration of consequence or phenomenon following the term "avoid" or "avoiding".

In explaining the present disclosure, "a finger" of a human hand is usually mentioned. The finger may be a thumb, an index finger, a middle finger, a ring finger or a little finger. The finger is joined with a palm of the hand. Except the thumb, the finger has three finger segments separated by two creases. Each finger segment is a segment of finger including skin, flesh and bone. A distal phalanx is a finger segment farthest from the palm, and includes a fingertip. A proximal phalanx is a finger segment nearest to the palm. Except the thumb, each of other four fingers has a middle phalanx between the distal phalanx and the proximal phalanx.

A first aspect of the present disclosure is to provide a fingertip-motion sensing device wearable on a finger of a user for sensing a fingertip motion when the user uses the finger to carry out handwriting. Generally, the user carries out the handwriting on a surface or in the air. In the sensing device, an accelerometer module for measuring the 3D motion of the finger is installed near the fingertip for enhancing a SNR of measured handwritten signal while a battery module is positioned away from the fingertip for avoiding undesired loading on the fingertip.

Figure 1:
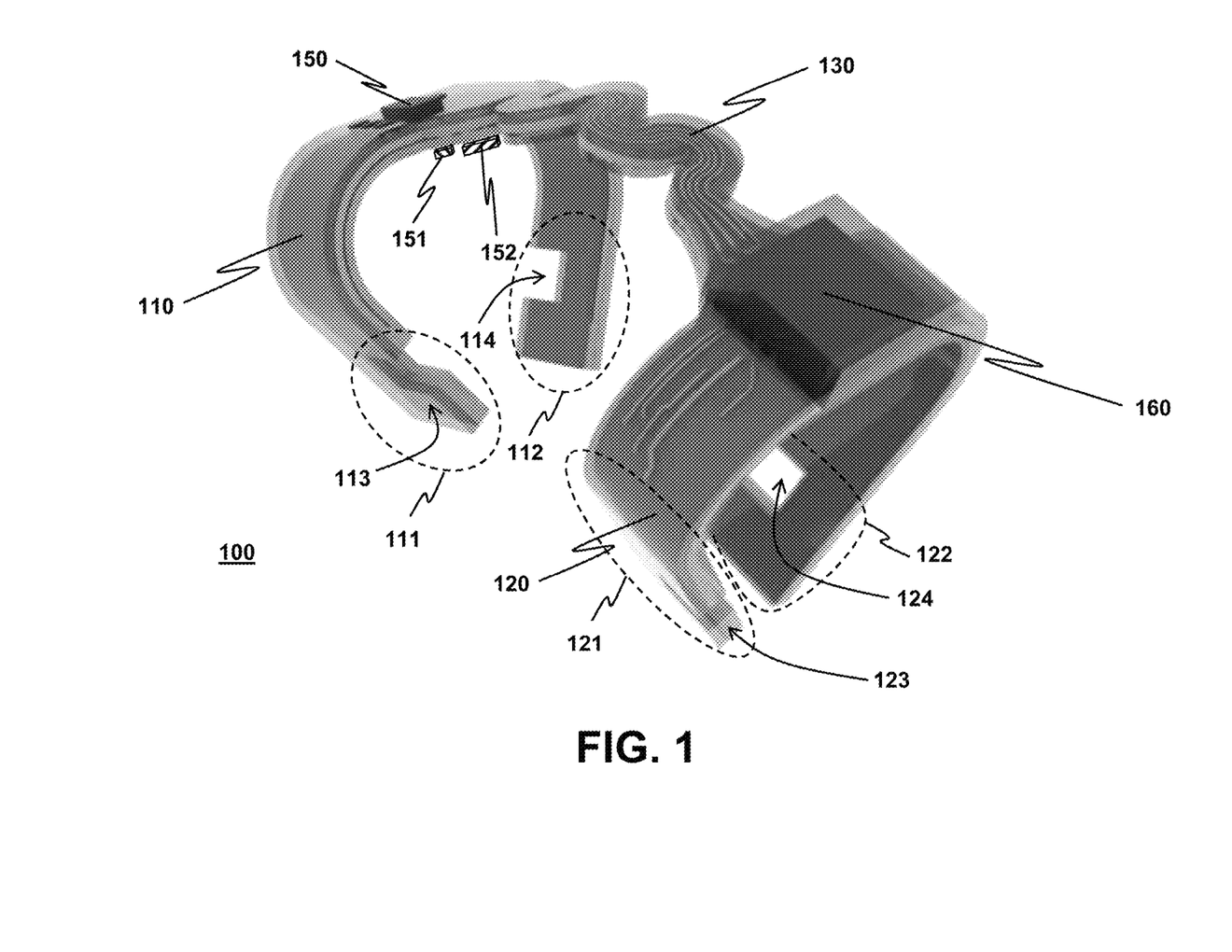
FIG. 1 depicts a structure of a fingertip-motion sensing device in accordance with an exemplary embodiment of the present disclosure.
Figure 2:
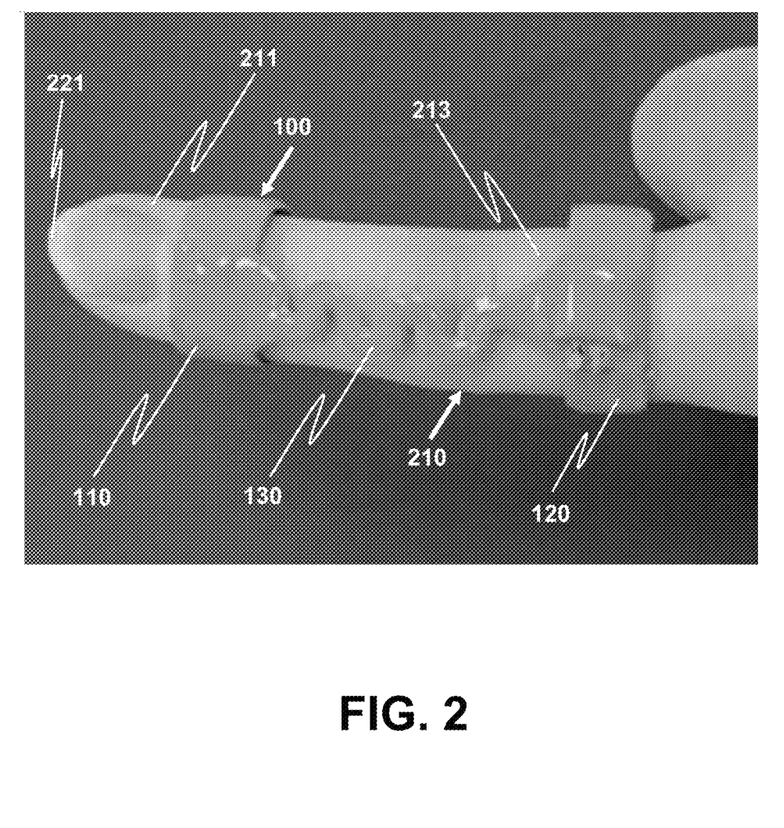
FIG. 2 depicts an exemplary use case of the sensing device where the sensing device is worn on a finger of a user for sensing the fingertip motion of the user.
Figure 3:
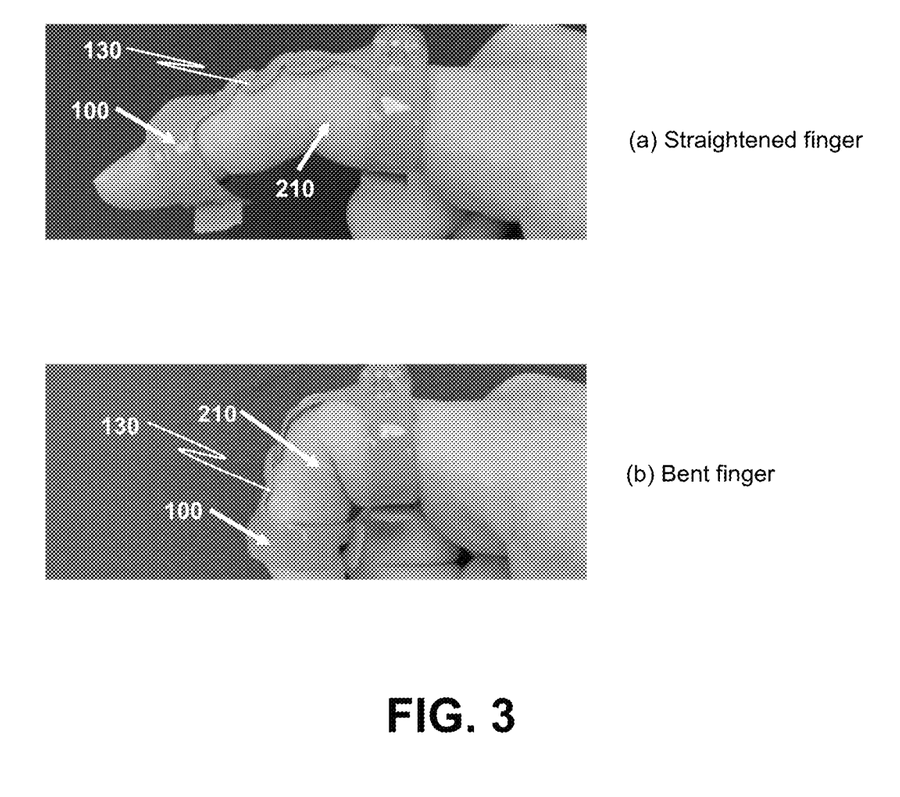
FIG. 3 illustrates that the sensing device is adaptable to both situations that the finger is bent and that it is straightened.

The disclosed sensing device is exemplarily illustrated with the aid of FIGS. 1-3. FIG. 1 depicts a structure of a fingertip-motion sensing device 100 in accordance with an exemplary embodiment of the present disclosure. FIG. 2 depicts an exemplary use case of the sensing device 100 where the sensing device 100 is worn on a finger 210 of a user. FIG. 3 illustrates that the sensing device 100 is adaptable to both situations that the finger 210 is bent and that it is straightened.

The sensing device 100 comprises a first body part 110, a second body part 120, and a bridge 130 connecting the first and second body parts 110, 120. The first body part 110 is configured to be worn on a distal phalanx 211 of the finger 210. The second body part 120 is configured to be worn on a proximal phalanx 213 of the finger 210. The bridge 130 is bendable for enabling the first and second body parts 110, 120 to remain positioned on the distal phalanx 211 and the proximal phalanx 213, respectively, when the finger 210 bends or is straightened.

Taking advantage of being positioned on or near a fingertip 221 of the finger 210, the first body part 110 is used for measuring the fingertip motion such that a high sensitivity of detecting the fingertip motion is obtainable. The first body part 110 comprises an accelerometer module 150 for measuring acceleration of the first body part 110 so as to generate acceleration data of the fingertip motion. The accelerometer module 150 contains an accelerometer, which is an IMU. The accelerometer performs acceleration measurements three-dimensionally so that the acceleration data generated by the accelerometer module 150 are 3D acceleration data.

The generated acceleration data are used to determine handwritten characters that have been written by the user. Since determination of the handwritten characters is a computationally intensive process, the acceleration data are arranged to be processed by an external device outside the sensing device 100. The first body part 110 further comprises a wireless communication module 152 for wirelessly transmitting the acceleration data to outside the sensing device 100. One practical realization of the wireless communication module 152 is a Bluetooth-enabled transceiver, which is wirelessly communicable with the external device based on a Bluetooth protocol that is standardized. One advantage of using the Bluetooth-enabled transceiver is that it has a low power consumption.

The second body part 120 is used for providing electrical power to power the accelerometer module 150, the wireless communication module 152 and all other electronic circuits in the sensing device 100. The second body part 120 comprises a battery module 160 for delivering electrical power via the bridge 130 to the accelerometer module 150 and wireless communication module 152. Directly powering the accelerometer module 150 by the battery module 160 rather than obtaining power through wireless power transfer provides greater available power to the accelerometer module 150, enabling the accelerometer module 150 to measure the fingertip motion more sensitively and hence generate the acceleration data with a greater SNR. In practical situations, the sensing device 100 is often required to support a prolonged lifetime of fingertip-motion sensing for handwriting recognition. The battery module 160 may have a size or weight too large to be accommodated on the first body part 110 without producing excessive hindrance to the user during handwriting. In the sensing device 100, installing the battery module 160 in the second body part 120 advantageously avoids the first body part 110 to be further loaded with the battery module 160 to thereby reduce hindrance to the user in using the finger 210 to carry out handwriting.

One potential source of interference to fingertip motion measurement by the accelerometer module 150 is an unintended movement between the first body part 110 and the distal phalanx 211. Usually, this unintended movement is due to slipping of the first body part 110 on the distal phalanx 211. The slipping usually occurs suddenly, causing the interference to be spurious in nature. The slipping is usually caused by switching between a bending pose and a straightened pose of the finger 210 such that the first body part 110 is displaced from its original position on the distal phalanx 211. Advantageously, the bridge 130 is extensible and retractable in length. Analogously, the bridge 130 behaves like an elastic coil spring, and can elongate and contract along a longitudinal direction of the bridge 130. As the bridge 130 is extensible and retractable in length, the displacement between the first and second body parts 110, 120 caused by bending or straightening of the finger 210 leads to a corresponding increase or decrease of the length of the bridge 130. Effectively, it enables the first and second body parts 110, 120 to be securely stationed on the distal phalanx 211 and the proximal phalanx 213, respectively, even when the finger 210 bends or is straightened as shown in FIG. 3. As an advantage, it avoids generation of spurious interference due to unintended movement between the first body part 110 and the distal phalanx 211. Preferably, the bridge 130 is wavily shaped (like a serpent) for enabling the bridge 130 to be extensible and retractable in length.

Electronic circuits are required to be implemented in the sensing device 100 for controlling the accelerometer module 150 and the wireless communication module 152 to function as intended. Preferably, the first body part 110 further comprises a MCU 151 for controlling the accelerometer module 150 and the wireless communication module 152, where the MCU 151 is configured to generate the acceleration data from raw measurement data obtained by the accelerometer module 150 in sensing the fingertip motion. The MCU 151 is a single integrated circuit intended to operate as an embedded system, and includes one or more computing processors for executing program instructions, a non-volatile memory for storing the program instructions, and input/output ports for controlling devices external to the MCU 151.

As mentioned above, the first body part 110 and the second body part 120 are configured to be worn on the distal phalanx 211 and the proximal phalanx 213, respectively. Preferably and as shown in FIG. 2, the first body part 110 is configured to form a first ring for wearing on the distal phalanx 211, and the second body part 120 is configured to form a second ring for wearing on the proximal phalanx 213.

Although the first and second rings may be made unopenable, it provides convenience to the user in putting the first and second body parts 110, 120 on the finger 210 if the first and second rings are openable as shown in FIG. 1. Preferably, as shown in FIG. 1, each of the first and second body parts 110, 120 is formed as an elongated, flexible strip having first and second end portions that are joinable to form a respective ring. Specifically, the first body part 110 has a pair of first end portion 111 and second end portion 112; and the second body part 120 has another pair of first end portion 121 and second end portion 122.

In certain embodiments, the first end portion 111 and the second end portion 112 of the first body part 110 are installed with a locking member 113 and a complementary locking member 114, respectively. The locking member 113 and the complementary locking member 114 are releasably engageable to each other such that the first and second end portions 111, 112 are joinable to form the first ring.

In certain embodiments, similarly, the first end portion 121 and the second end portion 122 of the second body part 120 are installed with a locking member 123 and a complementary locking member 124, respectively. The locking member 123 and the complementary locking member 124 are releasably engageable to each other such that the first and second end portions 121, 122 are joinable to form the second ring.

In certain embodiments, as shown in FIG. 1, the first body part 110 has the locking member 113 as a first hook clasp, and the complementary locking member 114 as a second hook clasp. Furthermore, the first and second hook clasps are integrally formed in the first body part 110. Other embodiments of the locking member 113 and the complementary locking member 114 are possible. In one embodiment, each of the locking member 113 and complementary locking member 114 is an adhesive pad. In another embodiment, the locking member 113 is a hook clasp and the complementary locking member 114 is an eye clasp.

Embodiments of the locking member 123 and the complementary locking member 124 of the second body part 120 are similar to those for the first body part 110, and will be easily obtained by those skilled in the art according to the teaching disclosed herein for the first body part 110.

In using the sensing device 100, the sensing device 100 is worn on the finger 210. The finger 210 that the sensing device 100 is worn is not limited only to be an index finger. The sensing device 100 may be worn on any one of the five fingers of a hand.

Figure 4:
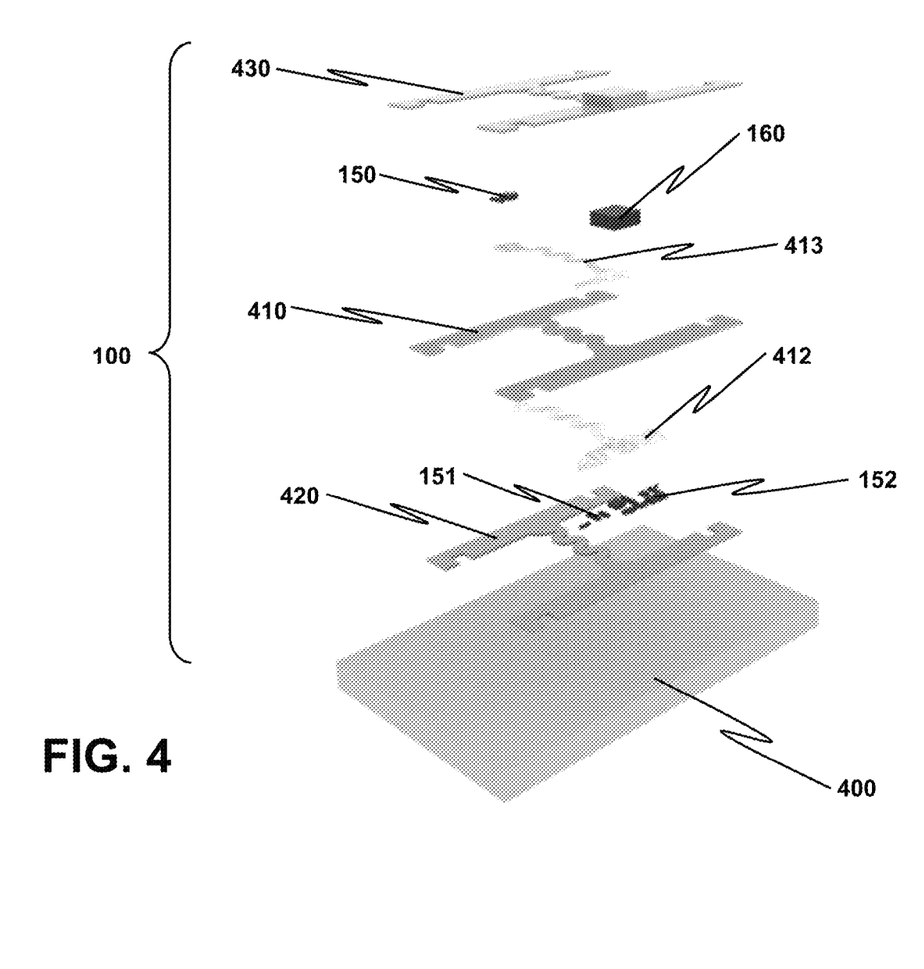
FIG. 4 depicts an exploded view of the sensing device for illustrating an internal structure thereof and an assembling plan thereof.

FIG. 4 depicts an exploded view of the sensing device 100 for illustrating an internal structure thereof and an assembling plan thereof. A human skin 400 is drawn in FIG. 4 to act as a positional reference.

Since the bridge 130 is bendable and since the first and second body parts 110, 120 are preferable to be flexible, it is desirable if a PCB for housing electronic circuits present in the sensing device 100 is flexible. Preferably, the sensing device 100 further comprises a FPCB 410 for mounting and electrically connecting the accelerometer module 150, the wireless communication module 152, the MCU 151 and the battery module 160. In particular, the FPCB 410 forms a portion of the first body part 110, a portion of the second body part 120 and a portion of the bridge 130. It follows that the FPCB 410 forms a means to integrate the first body part 110, the second body part 120 and the bridge 130. On the FPCB 410, a top electrode layer 413 and a bottom electrode layer 412 are collectively used to electrically connect the accelerometer module 150, the wireless communication module 152, the MCU 151, the battery module 160 and remaining electronic components in the sensing device 100.

Note that the FPCB 410 is a substrate that is flexible. In certain embodiments, the FPCB 410 is substantially composed of PI. Other polymer materials may also be used to form the FPCB 410.

It is advantageous to introduce protective layers to the sensing device 100 to protect electronic circuits on the FPCB 410. Preferably, the sensing device 100 further comprises a first protective layer 420 and a second protective layer 430 collectively used for encapsulating the FPCB 410. The FPCB 410 mounted with the accelerometer module 150, the wireless communication module 152, the MCU 151 and the battery module 160 is sandwiched between the first and second protective layers 420, 430. Note that the first protective layer 420 is arranged to contact the skin 400. A surface of the first protective layer 420 for contacting the skin 400 may be a smooth surface for avoiding causing discomfort to the user provided that the smooth surface is not easy to cause slipping between the first body part 110 and the finger 210 when the sensing device 100 is worn on the finger 210.

The first and second protective layers 420, 430 are also required to be flexible. In certain embodiments, the first and second protective layers 420, 430 are substantially composed of PDMS.

As an experimental demonstration of the fingertip-motion sensing device 100, a prototype sensing device was developed and tested.

Figure 7:
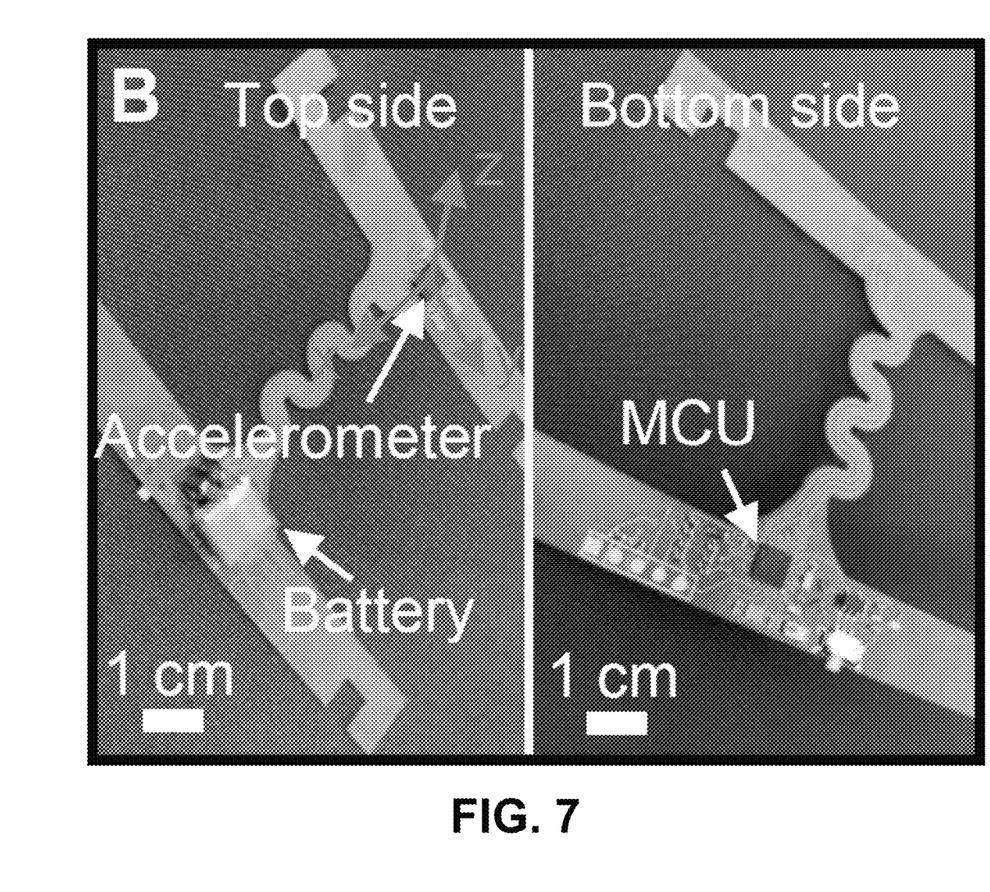
FIG. 7 shows top and bottom sides of a FPCB as used in a prototype sensing device for mounting electronic components.
Figure 8:
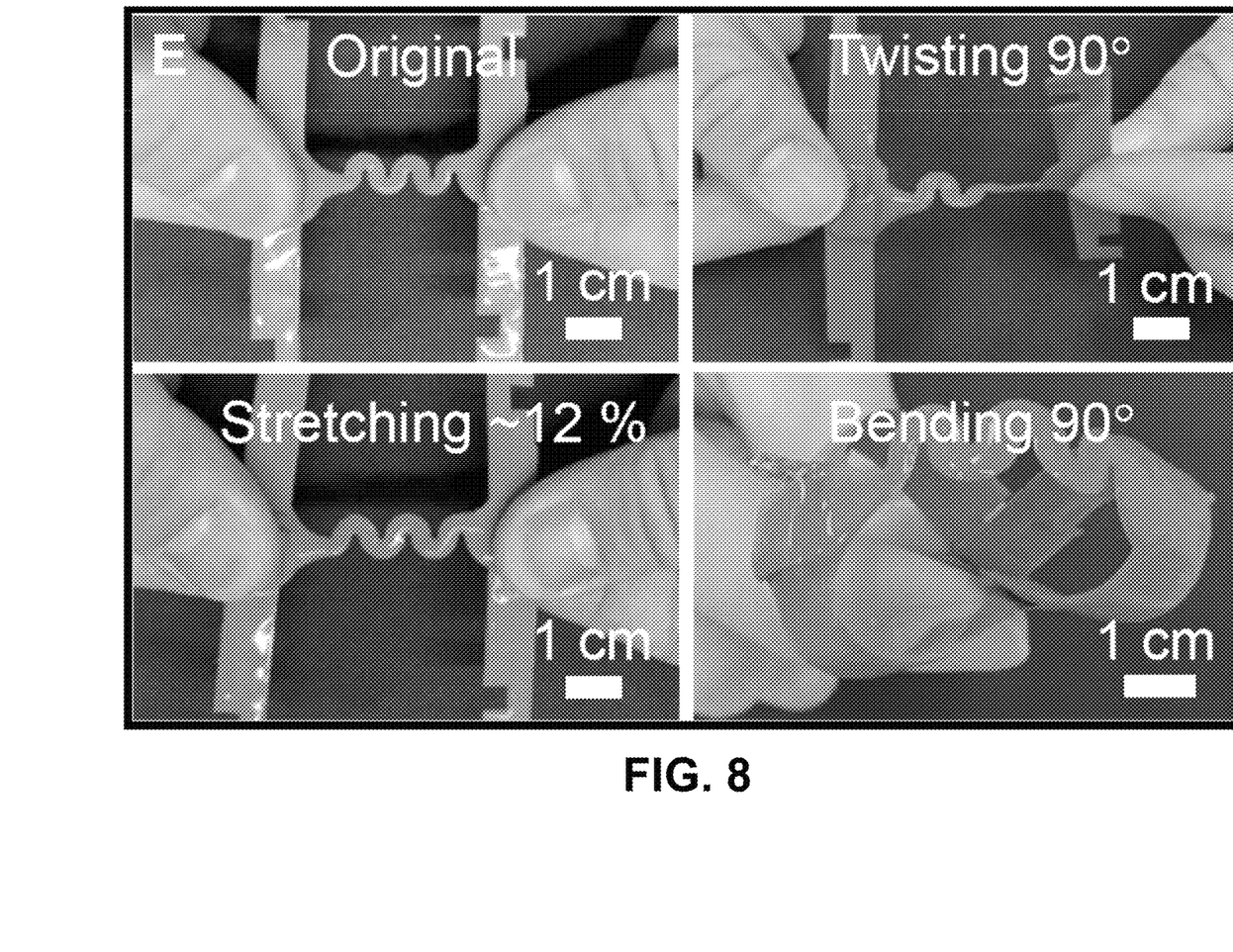
FIG. 8 depicts various mechanical deformations made to the prototype sensing device, showing that the prototype sensing device can operate normally under these deformations.
Figure 9:
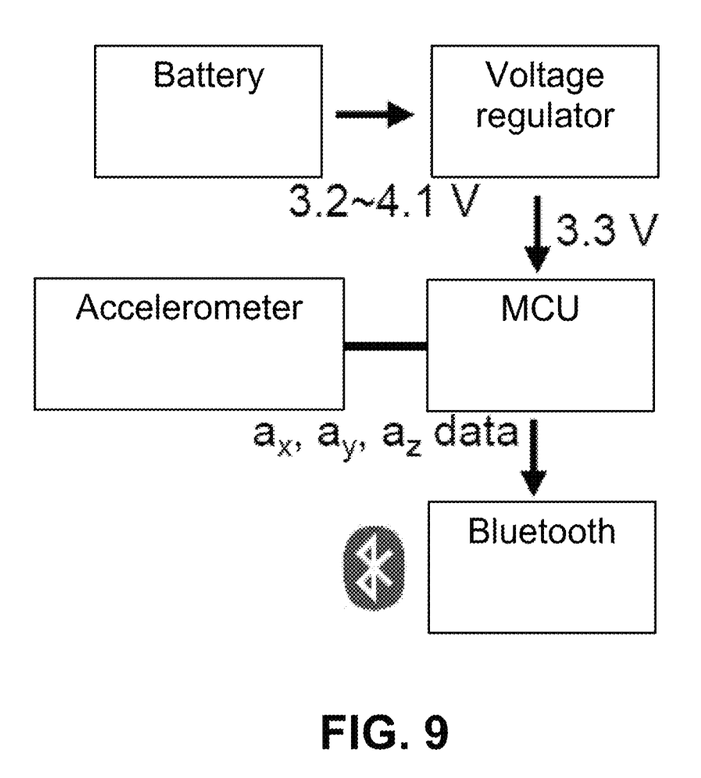
FIG. 9 shows a schematic of circuit design of the prototype sensing device.

The prototype sensing device is a soft, ultrathin, lightweight sensing device (thickness, 0.8 mm; weight, 3.24 g) based on an accelerometer in a finger-cot format, capable of conveniently mounting onto one finger for real-time capturing finger 3D motion in air on a horizontal imaginary plane. The prototype sensing device has a structure shown in FIG. 4. The prototype sensing device consists of two protective layers (PDMS, ~145 kPa), a series of electronic components (a MCU, an accelerometer module, resistors, capacitors, a Bluetooth module, and a miniaturized switch), and a self-designed FPCB. A serpentine-designed bridge is employed to connect the accelerometer module and other electrical elements for decreasing the impact induced by the electronics on fingertip motions. To make full use of the limited area of the electronics, the MCU and Bluetooth module with the matched resistors and capacitors are connected on the bottom side of the FPCB, and the Li battery and accelerometer module are positioned on the top side, as shown in FIG. 7. By cutting out two hook clasps at each ring end as the locking member and the complementary locking member, the prototype sensing device is capable of easily wearing onto a human index finger (as shown in FIG. 1). To minimize the influence of the electronics on a user, the accelerometer module is designed to mount around the user's fingertip with a few matched resistors and capacitors, which are electrically connected to the MCU and the battery module realized as a miniaturized Li-ion battery (45 mAh) located around the joint located between the index finger and the palm through a serpentine-designed bridge. Due to the advanced structure design, the prototype sensing device can operate normally under various mechanical deformations, including twisting 90°, twisting 180°, and bending over 90° (as shown in FIG. 8). To further demonstrate its electrical stabilization during practical applications, the prototype sensing device was worn on a human index finger with the finger performing various motions, including straightening and bending. It was observed that there was not any negative impact on the electrical performance of the prototype sensing device. FIG. 9 shows a schematic of circuit design of the prototype sensing device. First, the Li battery yields a constant voltage (3.2V~4.1V). The voltage regulator then stabilizes the voltage output to around 3.3V for operating the MCU, the Bluetooth module, and the accelerometer module. The data collected from the accelerometer module (3D acceleration, $a_x$, $a_y$, $a_z$) are further converted into a 2-byte value by the MCU. Then the 2-byte value is transmitted to an external computer by the Bluetooth module.

The prototype sensing device was tested in performance. The largest wireless transmission distances of the prototype sensing device as worn on 10 human subjects, including 8 males and 2 females, under different orientations of the subjects with respect to the external computer during handwriting were found to range from 7.02 m to 10.57 m. The long wireless communication distance (>7 m) between the prototype sensing device and the external computer indicates a great potential of the disclosed sensing device in various practical applications. Regarding the operation time of the Li battery, it was found that the operation time could reach up to 15.36 hours for the full charge state of the battery (4.1V), and 5.32 hours at 3, which is sufficient to support the human daily utilization. Due to the small energy capacity of the battery (45 mAh), it was found that it only took 2.8 minutes to charge the battery from a fully discharged state to a fully charged state under a direct-current power source of 5V. Electrical responses of the prototype sensing device mounted onto a human index finger with six different directions of movement were measured, and it was found that the prototype sensing device was capable of accurately and stably capturing human 3D motions. The stability of the prototype sensing device was further confirmed by repeatedly bending the prototype sensing device at ~60° for over 1000 cycles at a constant frequency of 0.4 Hz without any signal interruption.

A second aspect of the present disclosure is to provide a handwriting recognition system for recognizing handwritten characters produced by a user. The handwritten characters are determined from the acceleration signal generated by any of the embodiments of the sensing device 100 disclosed above.

Figure 5:
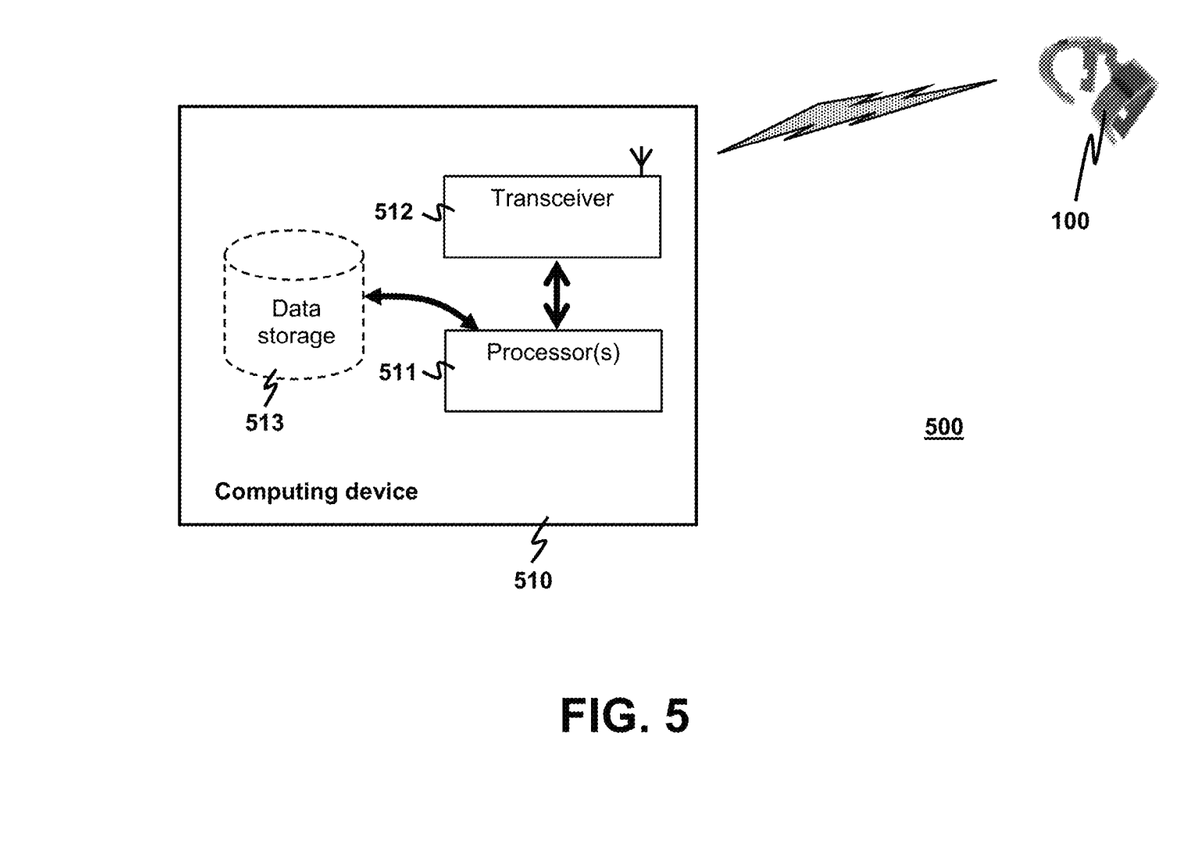
FIG. 5 depicts, in accordance with an exemplary embodiment of the present disclosure, a handwriting recognition system that employs the disclosed sensing device for sensing the fingertip motion of the user, where the system uses a computing device configured to execute a computing process to determine characters handwritten by the user.

FIG. 5 depicts a handwriting recognition system 500 in accordance with an exemplary embodiment of the present disclosure. The system 500 comprises the fingertip-motion sensing device 100 and a computing device 510. The sensing device 100 is used for sensing a fingertip motion of the user when the user wears the sensing device 100 on a finger of the user and uses the finger to carry out handwriting. The acceleration data generated by the sensing device 100 are wirelessly transmitted to the computing device 510. The computing device 510 is configured to wirelessly receive the acceleration data from the sensing device 100 and determine the handwritten characters from the acceleration data. In particular, the computing device 510 comprises: a wireless communication transceiver 512 for wirelessly communicating with the sensing device 100; and one or more processors 511 configured to execute a computing process of determining the handwritten characters from the acceleration data. Usually, a data storage device 513 accessible by the one or more processors 511 is included in the computing device 510. The data storage device 513 may be a hard disk, a solid-state storage device, etc.

Figure 6:
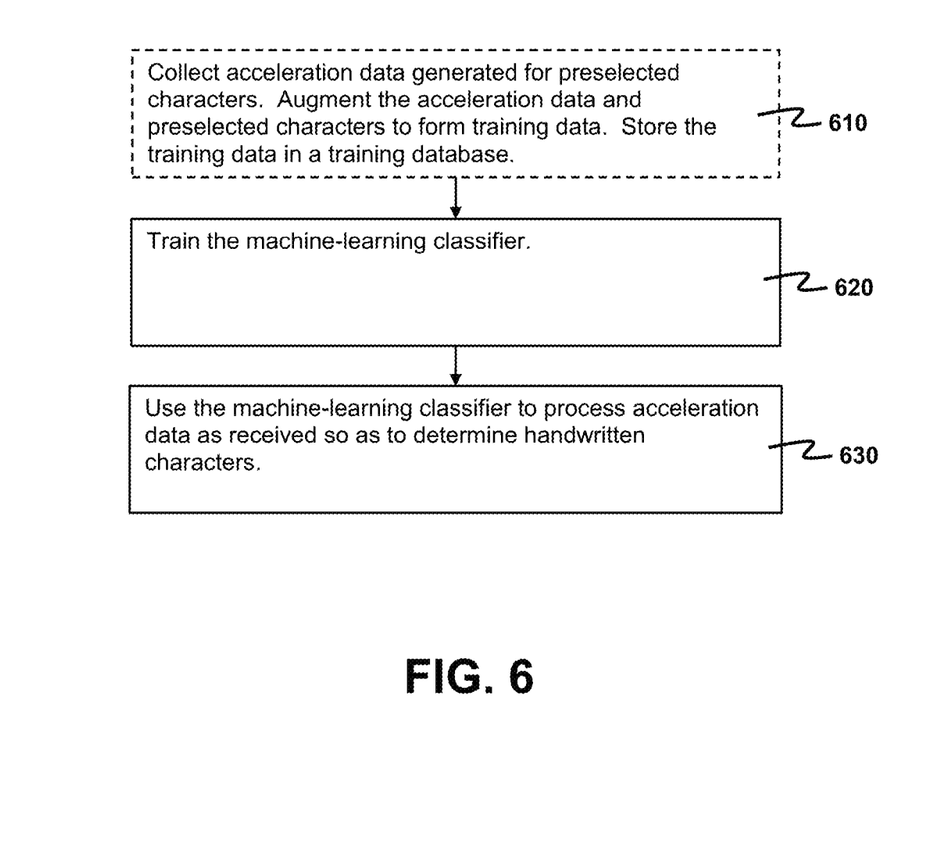
FIG. 6 depicts a flowchart showing exemplary steps of the computing process that is implemented with a machine-learning classifier.

Since an individual person has a unique personal style rarely the same as other people's styles in handwriting characters, a detection algorithm adaptable to the individual person is required in determining the characters handwritten by the individual person from the acceleration data. Preferably, the computing process executed by the one or more processors 511 is implemented with a machine-learning classifier for character determination. FIG. 6 depicts a flowchart showing exemplary steps of the computing process that is implemented with a machine-learning classifier.

In a step 630, the handwritten characters are determined from the acceleration data by using the machine-learning classifier after the machine-learning classifier is trained. Many different kinds of machine-learning classifiers are usable for determining the handwritten characters. Such classifiers include, but are not limited to, support vector machine, random forest, K-nearest neighbor, multi-layer perceptron, and CNN. As demonstrated later by experimental results, the CNN is a good choice to be used as the machine-learning classifier in the computing process.

Training of the machine-learning classifier is accomplished in a step 620 that precedes the step 630. In one scenario, the machine-learning classifier was already trained some time before execution of the step 620, and parameters of the classifier were calculated and stored in the data storage device 513. The step 620 is performed by simply loading the calculated parameters from the data storage device 513 to the machine-learning classifier. In another scenario, the calculated parameters are not available. The machine-learning classifier is trained based on training data that are already acquired by the computing device 510.

Optionally, the training data are generated in a step 610 before execution of the step 620. In the step 620, a plurality of acceleration data is first collected from the sensing device 100, where the plurality of acceleration data is generated by asking the user to write a list of preselected handwritten characters. The collected plurality of acceleration data is augmented with the list of preselected handwritten characters to form the training data. The training data are stored in a training database. The training database may be stored in the data storage device 513.

As an experimental demonstration of the handwriting recognition system 500, a prototype computing process for detecting the handwritten characters from the acceleration data was developed and tested.

The entire design process of developing the computing process is specifically divided into the following steps: (1) data signal input and transformation; (2) signal data processing; (3) dataset establishment; (4) training and optimizing the selected machine-learning classifier; and (5) real-time handwritten character recognition.

Data signal input and transformation. Once the prototype sensing device was worn on a human index finger to perform a writing task, acceleration data of the three channels were immediately recorded in real time and then transmitted to a personal computer through the Bluetooth module to obtain the original data.

Signal data processing. After normalizing the input signals of the three channels to eliminate the influence of dimensions, a multi-channel signal segmentation method based on a dynamic sliding window algorithm was executed, which could achieve accurate segmentation of continuous input signals composed of multiple characters with different lengths and effective differentiation of non-information channels. According to the Inventors' experience and previous research, after removing the front and back interference part of the signal, the acceleration amplitude threshold of the three-channel signal is set to the mean of the value of each channel signal ($m_x$, $m_y$, $m_z$). Once the value of any signal channel is greater than the respective threshold, it could be considered that the signal carrying information had started to be inputted. The single-symbol segment with primary information was intercepted as between 150 ms before and 1050 ms after the moment that the information-carrying signal started to be inputted, which was noted here as a sliding window of size 1.5 s.

Dataset establishment. In order to ensure the smooth progress of regular writing in most scenes, 106 unit symbols (including letters, numbers, Latin symbols, etc.) were selected for recognition, which could be combined into words, phrases, and even sentences after being accurately extracted by the dynamic sliding window algorithm with informative signals. The typical three acceleration channel signals of 106 regular characters came from handwriting experiments conducted by four non-disabled participants. During the experiments, more than 100 handwriting experiments with the prototype sensing device were performed for each symbol, keeping the time interval between 1 and 3 seconds for each character, starting and ending at smooth, so that each symbol could be clearly monitored when it started writing to identify transitions and measure response times. To effectively improve the accuracy and generalization ability of the machine-learning classifier for the recognition of handwritten symbols, a random slight disturbance was added to the acceleration signals of the three channels, and different sizes of sliding windows and sliding lengths (sliding rates) were set based on the dynamic sliding window method. In all experiments, the dataset segmentation method was the same as the previous research, in which 80% of the data were used for training, 20% of the data were used for testing, with an equal proportion of each handwritten symbol.

Training and optimizing the machine learning classifier. In order to better improve and optimize the performance of the recognizer, a variety of machine-learning classifiers were evaluated. The machine-learning classifiers under consideration included support vector machine (SVM), random forest (RF), K-nearest neighbor (KNN), multi-layer perceptron (MLP), and CNN. Compared with traditional machine learning algorithms, a CNN has a multi-layer structure, which improves the generalization performance and abstraction performance of the recognition model. The main structure of the CNN constructed in the prototype computing process had 5 layers, including 3 convolutional layers, 1 fully connected layer and 1 softmax layer. The fully connected layer was used to weigh the output matrix of the previous layer to fuse the local features into the global features, and the final output was a one-dimensional matrix in which each number represented the classification probability corresponding to each of the 106 characters.

The training environment was that: central processing unit (CPU) was 11th Gen Intel Core i7-11700K; graphics processing unit (GPU) was NVIDIA GeForce RTX 3090, having 10496 CUDA cores, with a memory capacity of 24 GB; random access memory (RAM) was 32 G in size; the development environment was Python+sklearn+PyTorch; and the neural network optimization algorithm that was used was the Adam optimizer. Among the machine-learning classifiers under consideration, the multi-layer perceptron (MLP) and CNN had the highest F1-score, prediction accuracy, and recall rate. Due to the smaller size, the CNN was selected as the machine-learning classifier of the prototype computing process. Experimental results obtained by the Inventors showed that when the window size was 1667 ms and the slide rate was 0.2, the CNN classifier performed the best.

Figure 10:
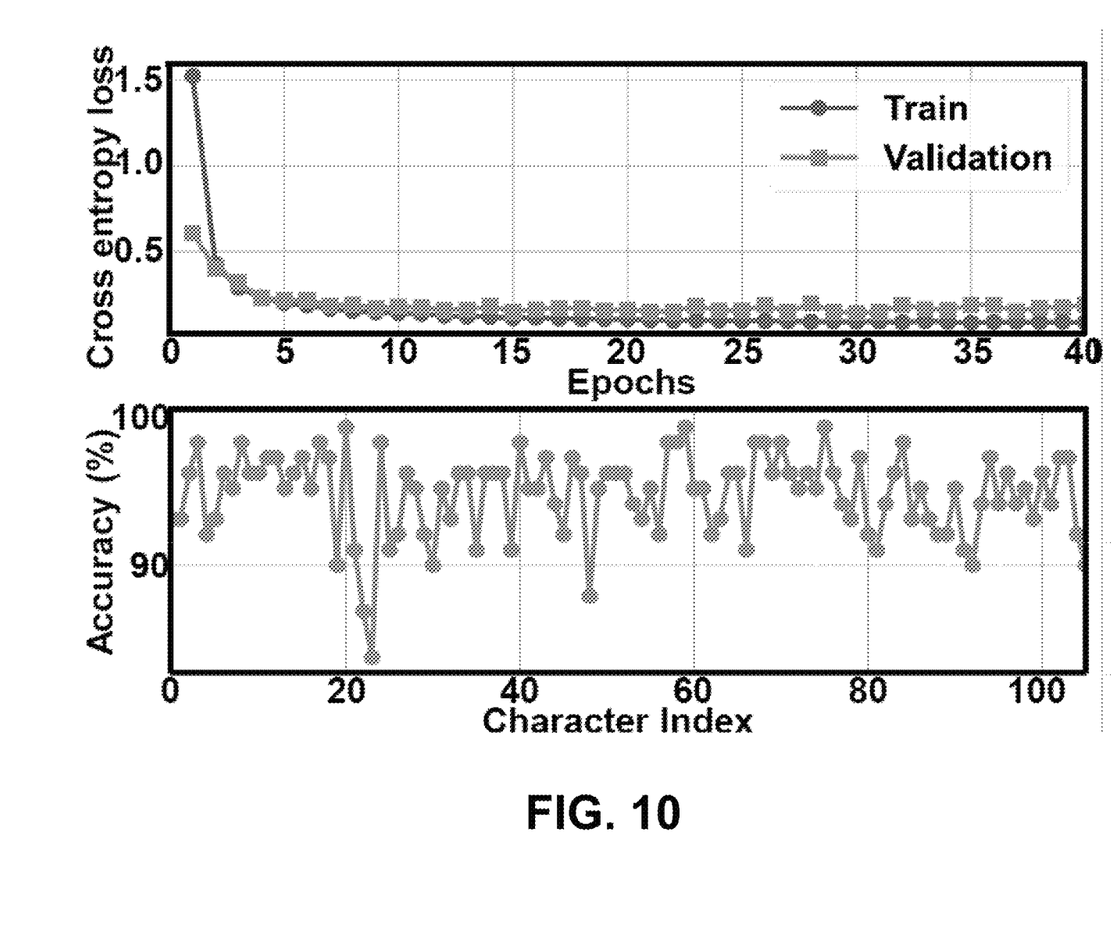
FIG. 10 plots percentage values of accuracy in handwriting recognition for all handwritten characters under test, and cross-entropy losses versus epochs in using a CNN model for handwriting recognition.
Figure 11:
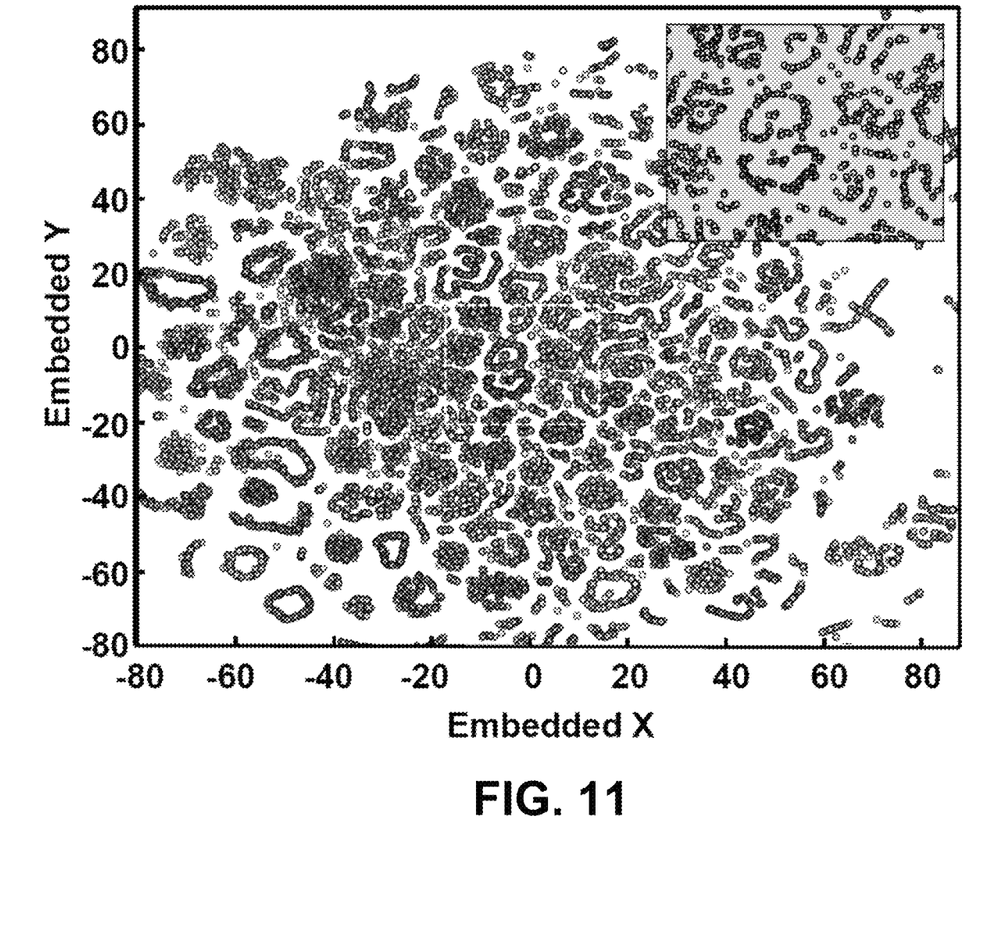
FIG. 11 shows a point cloud of a two-dimensional representation of 106 handwritten characters under test by the CNN model, where the point cloud was obtained by using the t-SNE algorithm.

FIG. 10 plots percentage values of accuracy in handwriting recognition for all the 160 handwritten characters under test, and cross-entropy losses versus epochs in using a CNN model for handwriting recognition. As shown in FIG. 10, the training of the CNN model could reach convergence after 40 epochs. The loss function of the training set and validation set is close, indicating that the trained CNN model was not overfitted, and most handwritten symbols could be recognized with an accuracy of more than 90%. The high recognition rate achieved by using the CNN model can fully meet the recognition requirements of many practical scenarios. FIG. 11 shows the point cloud of the two-dimensional representation of 106 handwritten character data sets obtained using the t-SNE algorithm. Note that images mapped to 2-dimensions via t-SNE approximate the creation of clusters. It yields a desirable visualization behavior because these results reflect the distribution of distances in the original high-dimensional space. From FIG. 11, it can be seen that the 106 different color clusters are different, and there is almost no overlap, indicating the excellent classification of the dataset in the high-dimensional space after processing by the CNN-based classifier.

Real-time input handwritten character recognition. In the process of real-time input handwritten character recognition, the prototype computing process could identify the start and end of each character's signal according to its fluctuation. In this process, except that there was no overlap between each window, the rest was consistent with the process of obtaining the training dataset, such as the window size. To test the recognition performance of the handwriting recognition system on the real-time input signals, a volunteer wore the prototype sensing device and wrote the word "excellent" on the personal computer to demonstrate handwriting recognition. FIG. 12 plots the writing of the test word "excellent" by handwriting in subplot (a), the acceleration data in the form of signal as generated by the acceleration module in subplot (b), and the likelihood of each handwritten character being one of the 26 English letters as obtained by the CNN model in subplot (c), where the detected handwritten characters are displayed one-by-one on a computer screen as shown in the subplot (a). As shown in the subplots (a) and (b), each handwritten letter was accurately displayed on the computer screen in real time. Furthermore, the multi-channel signal segmentation method based on a dynamic sliding window algorithm could effectively segment the input word signals, and the pre-trained CNN model could accurately predict the characters with high accuracy, as shown in the subplot (c).

As a remark, the disclosed handwriting recognition system 500 has an extensive range of application scenarios, such as remote online teaching, paperless writing for blind or paralyzed patients, replacement of bulky keyboardless input devices, etc.

The present invention may be embodied in other specific forms without departing from the spirit or essential characteristics thereof. The present invention is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A fingertip-motion sensing device wearable on a finger of a user for sensing a fingertip motion when the user uses the finger to carry out handwriting, the sensing device comprising:

a first body part configured to be worn on a distal phalanx of the finger;

a second body part configured to be worn on a proximal phalanx of the finger; and a bridge connecting the first and second body parts, the bridge being bendable for enabling the first and second body parts to remain respectively positioned on the distal phalanx and the proximal phalanx when the finger bends or is straightened;

wherein:

the first body part comprises an accelerometer module for measuring acceleration of the first body part so as to generate acceleration data of the fingertip motion;

the second body part comprises a battery module for delivering electrical power via the bridge to the accelerometer module, avoiding the first body part to be further loaded with the battery module to thereby reduce hindrance to the user in using the finger to carry out handwriting;

the bridge is extensible and retractable in length, enabling the first and second body parts to be securely stationed on the distal phalanx and the proximal phalanx, respectively, even under a displacement between the first and second body parts caused by bending or straightening of the finger, whereby generation of spurious interference due to unintended movement between the first body part and the distal phalanx is avoided; and the first body part, the second body part, and the bridge are integrally formed as one piece by sharing a flexible printed circuit board (FPCB).

2. The sensing device of claim 1, wherein the bridge is wavily shaped for enabling the bridge to be extensible and retractable in length.

3. The sensing device of claim 1, wherein the first body part further comprises:
- a wireless communication module for wirelessly transmitting the acceleration data to outside the sensing device; and
- a microcontroller unit (MCU) for controlling the accelerometer module and wireless communication module, the MCU being configured to generate the acceleration data from raw measurement data obtained by the accelerometer module in sensing the fingertip motion.

4. The sensing device of claim 3, wherein the wireless communication module is wirelessly communicable with an external device according to a Bluetooth protocol.

5. The sensing device of claim 3, wherein the FPCB mounts and electrically connects the accelerometer module, the wireless communication module, the MCU and the battery module, wherein the FPCB forms a portion of the first body part, a portion of the second body part and a portion of the bridge.

6. The sensing device of claim 5, wherein the FPCB is substantially composed of polyimide (PI).

7. The sensing device of claim 5 further comprising:
- a first protective layer and a second protective layer collectively used for encapsulating the FPCB, wherein the FPCB mounted with the accelerometer module, the wireless communication module, the MCU and the battery module is sandwiched between the first and second protective layers.

8. The sensing device of claim 7, wherein the first and second protective layers are substantially composed of polydimethylsiloxane (PDMS).

9. A handwriting recognition system for recognizing handwritten characters produced by a user, the system comprising:
- the fingertip-motion sensing device of claim 3 for sensing a fingertip motion of the user when the user wears the sensing device on a finger of the user and uses the finger to carry out handwriting; and
- a computing device configured to wirelessly receive the acceleration data from the sensing device and determine the handwritten characters from the acceleration data.

10. The handwriting recognition system of claim 9, wherein the computing device is further configured to execute a computing process of determining the handwritten characters from the acceleration data, the computing process comprising:
- using a machine-learning classifier to determine the handwritten characters from the acceleration data after the machine-learning classifier is trained.

11. The handwriting recognition system of claim 10, wherein the machine-learning classifier is a convolutional neural network (CNN).

12. The sensing device of claim 1, wherein the first body part is configured to form a first ring for wearing on the distal phalanx, and the second body part is configured to form a second ring for wearing on the proximal phalanx.

13. The sensing device of claim 12, wherein a respective body part selected from the first and second body parts is formed as an elongated, flexible strip having first and second end portions that are joinable to form a respective ring.

14. The sensing device of claim 13, wherein the first end portion is formed with a first hook clasp and the second end portion is formed with a second hook clasp, the first and second hook clasps being releasably engageable to each other such that the first and second end portions are joinable.

15. The sensing device of claim 13, wherein each of the first and second end portions is installed with an adhesive pad such that the first and second end portions are joinable.

\* \* \* \* \*